United States Patent
Fourney

(10) Patent No.: US 8,544,634 B2
(45) Date of Patent: Oct. 1, 2013

(54) REVERSE METER BELT CONVEYOR

(75) Inventor: Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 13/519,434

(22) PCT Filed: Jan. 5, 2011

(86) PCT No.: PCT/US2011/020179
§ 371 (c)(1),
(2), (4) Date: Jun. 27, 2012

(87) PCT Pub. No.: WO2011/087937
PCT Pub. Date: Jul. 21, 2011

(65) Prior Publication Data
US 2012/0285799 A1    Nov. 15, 2012

Related U.S. Application Data

(60) Provisional application No. 61/294,646, filed on Jan. 13, 2010.

(51) Int. Cl.
*B65G 23/14* (2006.01)

(52) U.S. Cl.
USPC .......................... 198/779; 198/459.7; 198/697

(58) Field of Classification Search
USPC ................. 198/779, 459.6, 459.7, 459.8, 697
See application file for complete search history.

(56) References Cited

U.S. PATENT DOCUMENTS

| | | | |
|---|---|---|---|
| 3,534,848 A * | 10/1970 | Marks et al. | 198/697 |
| 4,262,794 A | 4/1981 | Bourgeois | |
| 5,261,527 A | 11/1993 | Krismanth et al. | |
| 6,131,372 A | 10/2000 | Pruett | |
| 6,318,544 B1 * | 11/2001 | O'Connor et al. | 198/853 |
| 6,571,937 B1 | 6/2003 | Costanzo et al. | |
| 7,040,480 B2 | 5/2006 | Sedlacek | |
| 7,506,750 B2 | 3/2009 | Costanzo et al. | |
| 7,533,766 B1 * | 5/2009 | Fourney | 198/370.09 |
| 7,537,105 B2 * | 5/2009 | Fourney | 198/732 |
| 7,775,345 B2 * | 8/2010 | Fourney | 198/779 |
| 8,109,384 B2 * | 2/2012 | Pressler et al. | 198/779 |
| 2008/0121498 A1 * | 5/2008 | Costanzo et al. | 198/779 |
| 2008/0264757 A1 | 10/2008 | Fourney | |

OTHER PUBLICATIONS

News Release, "New—the Live Roller Merge Conveyor," ca. Jan. 2009, Nercon Engineering and Mfg., Inc., Oshkosh, WI, USA.
Brochure, "The Live Roller Merge," ca. Jan. 2009, Nercon Engineering and Mfg., Inc., Oshkosh, WI, USA.

* cited by examiner

*Primary Examiner* — Mark A Deuble
(74) *Attorney, Agent, or Firm* — James T. Cronvich

(57) ABSTRACT

A conveyor and a method for metering articles on a conveyor belt advancing in a direction of belt travel. Article-supporting rollers in the belt are actuated by a stationary bearing surface defining an upstream acceleration zone to accelerate articles forward along the conveyor belt. An activation belt advancing in the direction of belt travel at a speed faster than the conveyor belt provides a mobile bearing surface that actuates the belt rollers to rotate opposite to the direction of belt travel in a downstream deceleration zone. The conveyor belt also has regularly spaced retractable flights, which are retracted by contact with the stationary bearing surface in the acceleration zone and extended into a blocking position by contact with the mobile bearing surface in the deceleration zone. Articles in the deceleration zone are pushed rearward atop the rollers into metered positions against the leading faces of the flights.

8 Claims, 2 Drawing Sheets

REVERSE METER BELT CONVEYOR

BACKGROUND

The invention relates generally to power-driven conveyors and more particularly to a conveyor using a conveyor belt with rollers that are operable to drive conveyed articles backward into registration against selectively raised, regularly spaced flights.

It is often necessary to separate and space articles at regular or known positions on a conveyor belt to provide a constant, regular supply of articles. One example of a system for separating and spacing conveyed articles is described in U.S. Patent Application Publication No. 2008/0264757A1,"Systems and Methods for Providing an Improved Timing Conveyor," to Matthew L. Fourney, published Oct. 30, 2008.In that system, a conveyor belt uses actuatable rollers to accelerate conveyed articles atop the rollers forward until the articles reach the trailing faces of retractable flights positioned at regular spacings on the belt. In this way, the articles are separated and regularly spaced on the belt with each article resting on rollers behind a flight. But, in this conveyor, the only force pushing the articles forward is imparted by the rollers. If the articles encounter enough resistance to forward motion, as they could when undergoing certain processes, the articles can slide on the rollers and slow down or even stop, which affects the regular spacing and can degrade the processing step.

SUMMARY

One version of a conveyor embodying features of the invention comprises a conveyor belt advancing along a carryway at a first speed in a direction of belt travel from an upstream end to a downstream end. The conveyor belt includes an outer conveying side and an opposite inner side. Article-supporting rollers extending outward of the outer conveying side and the opposite inner side are arranged to rotate on axes perpendicular to the direction of belt travel. Flights are disposed at spaced apart locations along the length of the conveyor belt. Each flight includes an actuating element extending outward of the inner side of the conveyor belt and a stop movable between a retracted position at or below the level of the rollers that extend outward of the outer conveying side and a blocking position extending outward from the outer conveying side to a level above the level of the rollers. An activation belt underlying the conveyor belt in a portion of the carryway provides a mobile bearing surface that contacts the rollers and the actuating elements of the flights at the inner side of the conveyor belt. The activation belt advances in the direction of belt travel at a second speed greater than the first speed. This causes the flights to move into the blocking position and the rollers to rotate opposite to the direction of belt travel on the conveying side, which pushes articles supported atop the rollers opposite to the direction of belt travel against the stops in the blocking position.

In another aspect of the invention, a method for metering articles on a conveyor belt comprises: (a) raising stops at spaced locations along the length of a conveyor belt advancing along a carryway in a direction of belt travel from a lowered retracted position to a blocking position in a downstream portion of the carryway; and (b) pushing the articles rearward atop rollers in the conveyor belt against the stops in the blocking position by rotating the rollers in the conveyor belt opposite to the direction of belt travel as the conveyor belt advances in the direction of belt travel.

BRIEF DESCRIPTION OF THE DRAWINGS

These aspects and features of the invention are better understood by referring to the following description, appended claims, and accompanying drawings, in which:

DETAILED DESCRIPTION

Figure 1:
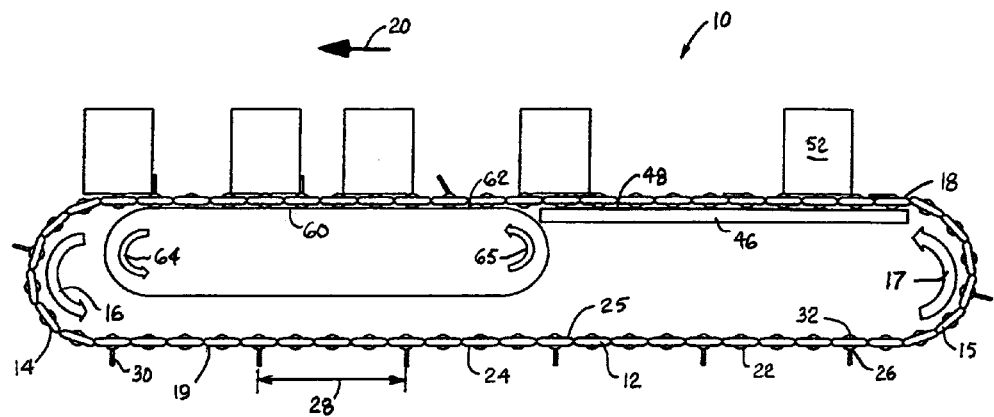
FIG. 1 is a side elevation view of one version of a conveyor embodying features of the invention.

A metering conveyor embodying features of the invention is shown in FIG. 1. The conveyor 10 comprises an endless conveyor belt 12 trained around drive sprockets at a downstream end 14 and idle sprockets at an upstream end 15. The sprockets rotate on shafts (not shown) in the direction given by arrows 16, 17 to drive the belt at a first speed along an upper carryway 18 in the direction of belt travel 20.

The conveyor belt includes a plurality of rollers 22 arranged to rotate on axes perpendicular to the direction of belt travel 20. The rollers protrude outward of an outer conveying side 24 of the belt 12 and an opposite inner side 25. The conveyor belt also includes flights 26 at regular spacings 28 along its length. Each flight is retractable and includes a stop 30 that is movable between a blocking position outward of the rollers on the conveying side of the belt and a lowered retracted position below the level of the rollers. Each flight also includes an actuating element 32 extending outward of the inner side of the conveyor belt opposite the stop 30.

Figure 2:
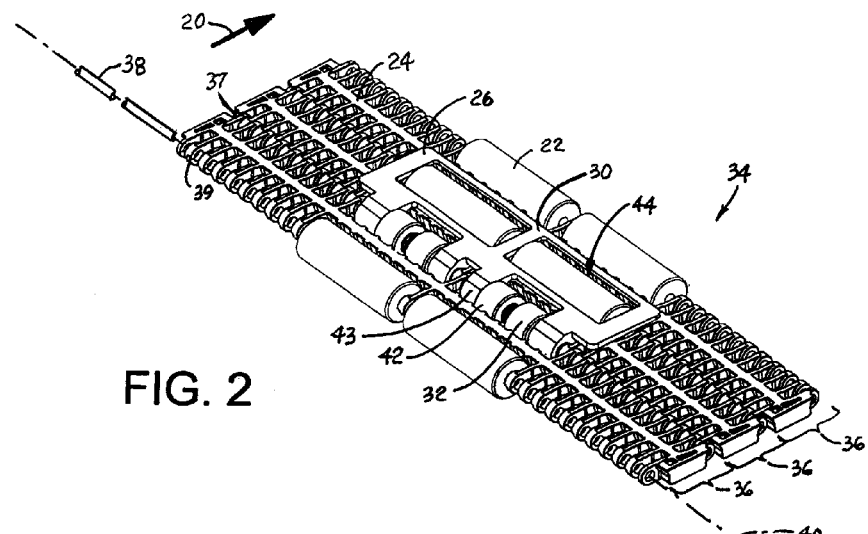
FIG. 2 is an isometric view of a portion of one version of a conveyor belt usable in a conveyor as in FIG. 1.

One example of a belt usable in a conveyor as in FIG. 1 is shown in FIG. 2. The portion of the belt shown is an INTRALOX® Series 900 Pre-Merge modular plastic conveyor belt manufactured and sold by Intralox, L.L.C. of Harahan, La., U.S.A. The belt section 34 shown comprises three rows 36 of belt modules connected together at hinge joints 37 by hinge pins 38 inserted in interleaved hinge elements 39 of adjacent rows. In this example, the rollers 22 are mounted on the hinge pins, which define the rollers' axes of rotation 40. The actuating elements 32 of the flights 26 are mounted rotatably on the hinge rods between rows. The actuating elements have rolling surfaces 42 similar in construction to the rollers 22 and with the same radius. The actuating elements bear laterally against the bottom sides 43 of the flights to cause the flights to rotate with the actuating elements in a low-torque activation system. The retractable flight 26 in FIG. 2 is shown in its lowered retracted position. Windows 44 in the stop portions 30 of the flights accommodate the rollers forward of the flights in the direction of belt travel 20. In this way, the rollers extend farther outward from the conveying side 24 than the fully retracted stops 30. The flight is prevented from rotating past the raised blocking position in which the stop is generally perpendicular to the plane of the conveying side of the belt by interference between structure on the flight and structure in the belt.

The conveyor belt of FIG. 2 represents just one example of a belt usable in the conveyor of FIG. 1. But other belt constructions may be used. For example, the axes of rotation may be defined by dedicated axles instead of hinge pins. And the rollers need not be so elongated as in FIG. 2 and could be mounted across more of the width of the belt. The actuating elements could be formed together with the stops in a one-piece construction as in FIG. 1. Furthermore, the flights could be sized and arranged not to interfere with the rollers when the flights are retracted without windows formed in the flights.

Figure 3:
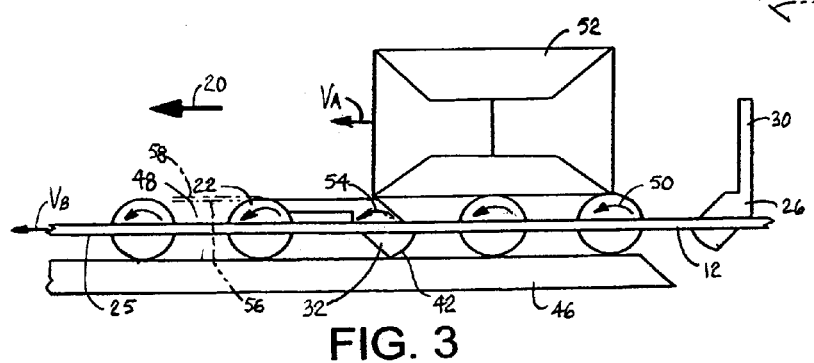
FIG. 3 is an enlarged side elevation view of the upstream acceleration zone of a conveyor as in FIG. 1.

In FIG. 1, the stops 30 of the flights 26 are shown in the extended blocking position as they make their way from a lower returnway 19 around the idle sprockets to the upstream end 15 of the carryway 18. A static friction bed 46 underlying the conveyor belt 12 in an upstream portion of the conveyor provides a stationary bearing surface 48 on which the belt rollers 22 roll as the conveyor belt advances in the direction of belt travel 20. As also shown in FIG. 3, the article-supporting rollers 22 riding on the stationary bearing surface rotate on their axes as indicated by arrows 50. This causes articles 52 supported atop the rollers to be accelerated forward at a speed $V_A$ that is twice the speed $V_B$ of the conveyor belt along the carryway. (Speeds, as used in this specification, are relative to a stationary, grounded observer.) In this upstream acceleration zone, leading articles fed onto the conveyor belt increase their separation from trailing articles. The bearing surface of the friction bed also engages the actuating elements 32 of the flights 26. Like the rollers, the actuating elements extend outward of the inner side 25 of the conveyor belt. When the rolling, or cam, surface 42 contacts the stationary bearing surface 48, the flight pivots forward about its axis, as indicated by arrow 54, into its lowered retracted position. The stop 30 is at a level 56 at or below the roller level 58, which is defined by the tangent to the topmost points of the rollers 22. In this way, the stop does not interfere with the forward acceleration of the articles 52 in the upstream acceleration zone.

Figure 4:
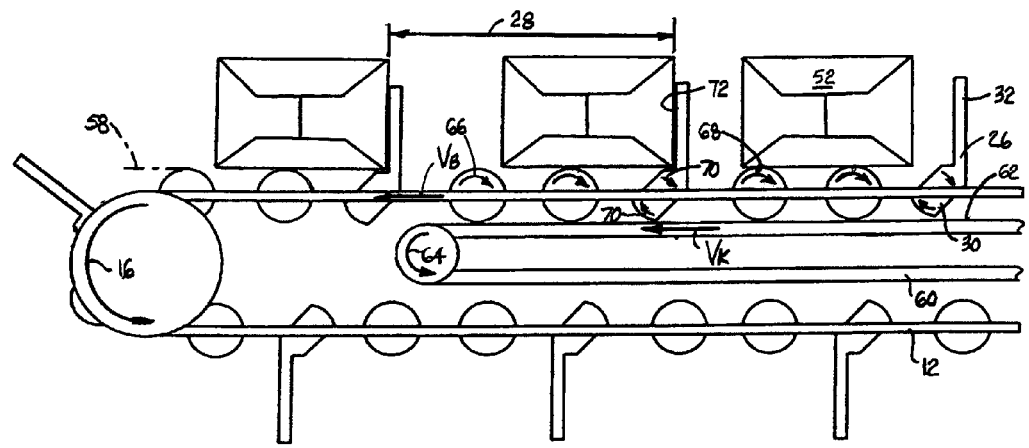
FIG. 4 is an enlarged side elevation view of the downstream deceleration zone of a conveyor as in FIG. 1.

An activation belt 60 provides a mobile bearing surface 62 to the rollers 22 and the actuating elements 32 of the flights 26 in a downstream zone of the carryway 18, as shown in FIG. 1. The activation belt may be used without the upstream static friction bed. Like the conveyor belt 12, the activation belt 60 advances on its upper run in the direction of belt travel 20. (The term "mobile" is used in the specification to mean that the bearing surface can advance along the direction of belt travel, as opposed to "stationary," which means that the bearing surface cannot advance in the direction of belt travel.) The activation belt, which may be realized as a flat-top modular plastic belt or a flat belt with a high-friction outer surface, for example, is trained around drive and idler pulleys, sprockets, or drums as indicated by arrows 64, 65 at each end. As also illustrated in FIG. 4, the activation belt is driven along its upper run at a speed $V_K$ greater, for example, 50% greater, than the speed $V_B$ of the conveyor belt. This causes the rollers 22 in the belt riding on the mobile bearing surface 62 to rotate opposite to the direction of belt travel 20 as indicated by arrows 66. (As used throughout this specification, the direction of roller rotation refers to the direction of the tangential velocity of a roller at its topmost point 68 along the carryway.) Because the rollers in the acceleration zone rotate opposite to the rollers in contact with the activation belt, they decelerate the articles. Consequently, the activation belt defines a deceleration zone. Contact between the actuating elements 32 of flights 26 and the mobile bearing surface advancing in the direction of belt travel also rotates the flights, as indicated by arrow 70, and raises the stops 30 to a blocking position above the level 58 of the rollers. The backward rotating rollers 22 push the articles rearward (relative to the conveying side of the conveyor belt) against a leading face 72 of the trailing stop in the blocking position. Once in contact with the blocking flights, the articles advance forward with the flights at the speed $V_B$ of the conveyor belt. The rotating rollers merely slide along the bottoms of the blocked articles. Thus, the conveyor meters the articles in reverse, separating consecutive individual articles 52 on regular spacings 28 defined by the locations of the flights. Furthermore, the flights in their blocking positions prevent the articles from being pushed farther rearward by resistance from some external force.

Figure 5:
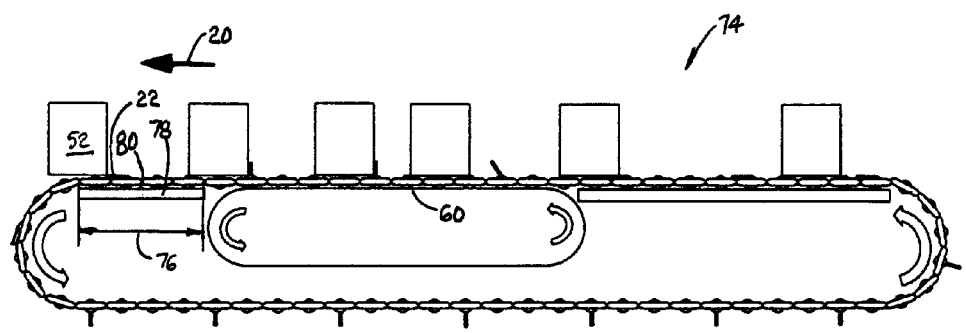
FIG. 5 is a side elevation view of another version of a conveyor embodying features of the invention including a second acceleration zone downstream of the deceleration zone.

Another conveyor embodying features of the invention is shown in FIG. 5. The conveyor 74 adds a second acceleration zone 76 downstream of the deceleration zone defined by the extent of the activation belt 60. The length of the second acceleration zone is defined by the length of a second friction bed 78 providing an upper stationary bearing surface 80. This second acceleration zone acts just like the upstream acceleration zone to lower the flights 26 to their retracted position and to rotate the rollers 22 forward in the direction of belt travel 20 and accelerate the articles 52 forward to increase their separation.

What is claimed is:

1. A conveyor comprising:
a conveyor belt advancing along a carryway at a first speed in a direction of belt travel from an upstream end to a downstream end, the conveyor belt including:
an outer conveying side and an opposite inner side;
a plurality of article-supporting rollers extending outward of the outer conveying side and the opposite inner side and arranged to rotate on axes perpendicular to the direction of belt travel;
a plurality of flights disposed at spaced apart locations along the length of the conveyor belt, the flights each including an actuating element extending outward of the inner side of the conveyor belt and a stop movable between a retracted position at or below the level of the rollers extending outward of the outer conveying side and a blocking position extending outward from the outer conveying side to a level above the level of the rollers;
an activation belt underlying the conveyor belt in a portion of the carryway and providing a mobile bearing surface contacting the rollers and the actuating elements of the flights at the inner side of the conveyor belt, wherein the activation belt advances in the direction of belt travel at a second speed greater than the first speed to cause the flights to move into the blocking position and the rollers to rotate opposite to the direction of belt travel on the conveying side to push articles supported atop the rollers opposite to the direction of belt travel against the stops in the blocking position.

2. A conveyor as in claim 1 wherein the actuating element comprises a rolling surface opposite the stop.

3. A conveyor as in claim 1 further comprising a stationary bearing surface underlying the conveyor belt in a portion of the carryway upstream of the activation belt and contacting the rollers extending outward of the inner side to cause the rollers to rotate in the direction of belt travel on the outer conveying side and contacting the actuating elements of the flights to force the stops to the retracted position.

4. A conveyor as in claim 3 further comprising a second stationary bearing surface underlying the conveyor belt on the carryway downstream of the activation belt and contacting the actuating elements of the flights to force the flights to the retracted position and contacting the rollers extending outward of the inner side of the conveyor belt to cause the rollers to rotate in the direction of belt travel on the outer conveying side and accelerate supported articles along the length of the conveyor belt in the direction of belt travel.

5. A method for metering articles on a conveyor belt, comprising:
- raising stops at spaced locations along the length of a conveyor belt advancing along a carryway in a direction of belt travel from a lowered retracted position to a blocking position in a portion of the carryway;
- pushing the articles rearward atop rollers in the conveyor belt against the stops in the blocking position by rotating the rollers in the conveyor belt opposite to the direction of belt travel as the conveyor belt advances in the direction of belt travel.

6. The method of claim 5 comprising:
- pushing the articles rearward by providing a mobile bearing surface moving in the direction of belt travel in contact with the rollers along an inner side of the conveyor belt at a speed faster than the speed of the conveyor belt.

7. The method of claim 5 further comprising:
- accelerating articles forward atop the rollers in the conveyor belt in an upstream portion of the carryway by rotating the rollers in the direction of belt travel as the conveyor belt advances.

8. The method of claim 7 comprising:
- lowering the stops in a further downstream portion of the carryway; and
- accelerating the articles forward atop the rollers in the further downstream portion by rotating the rollers in the direction of belt travel as the conveyor belt advances.

\* \* \* \* \*